J. W. Hodges,
Horseshoe.

No. 2,172 Reissued Feb. 13, 1866.

Witnesses:
W. F. Hall
Edward H. Knight.

Inventor
J. W. Hodges

N. PETERS, PHOTO-LITHOGRAPHER, WASHINGTON, D. C.

UNITED STATES PATENT OFFICE.

J. WILSON HODGES, OF BALTIMORE, MARYLAND, ASSIGNOR TO HIMSELF AND P. DE MURGUIONDO.

HORSESHOE.

Specification forming part of Letters Patent No. 48,623, dated July 4, 1865; Reissue No. 2,172, dated February 13, 1866.

*To all whom it may concern:*

Be it known that I, J. WILSON HODGES, of the city and county of Baltimore, and State of Maryland, have made new and useful Improvements in Horseshoes; and I hereby declare the following to be a full, clear, and exact description of the nature, construction, and operation of the same, reference being had to the annexed drawings, making part of this specification, in which—

Figure 1:
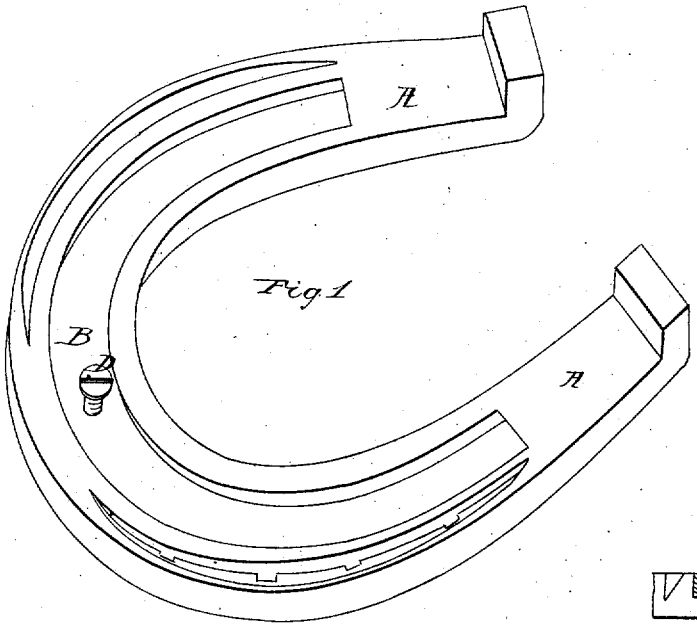
Figure 4:
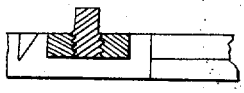
Figure 2:
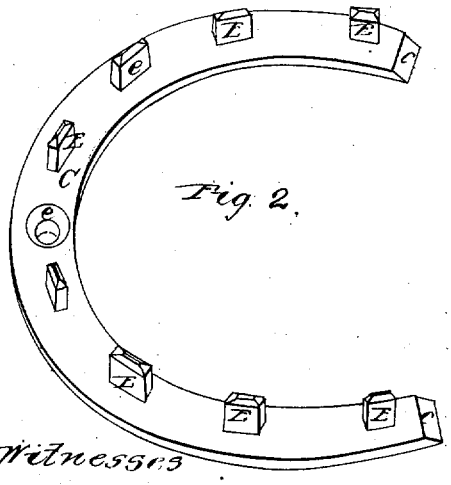
Figure 3:
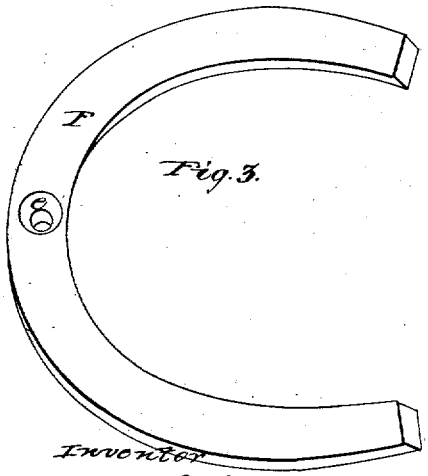

Figure 1 is a general perspective view of the shoe without the attached roughing-bar. Fig. 2 is the roughing-bar provided with calks or points, and which, when *in situ*, occupies the groove in the shoe. Fig. 3 is a blank-bar intended to occupy the groove in the shoe in the absence of the roughing-blank, and Fig. 4 is a detached section.

The object of my improvement is to provide a roughing attachment for horseshoes which may be applied, as required, to a horse's shoe, and which is removable when the occasion for its use ceases, its place being then occupied by a blank which prevents the groove or recess being filled with dirt.

To enable one acquainted with farming or the care of horses to construct and use my invention, I will describe it in detail.

A is a horseshoe of the ordinary contour, and may be or may not be provided with toe and heel calks. On the lower face of the shoe is a recess or square-sided groove, B, whose ends are somewhat undercut, so that the ends *c* of the bar C, being first inserted into their ends of the groove B, may be retained thereby. The bar C, being laid flat in its place, is secured by a screw, D, or several screws, if necessary, or by rivets or pins, if more convenient. The calks or points E are permanently inserted in either face of the bar, or made solid therewith, and project downwardly, speaking of the device in its position when the animal's foot is resting upon the ground. These calks may be of any required form and number.

The shoe A is attached in the ordinary way to the hoof of the animal, and does not differ from those commonly used except in the provision for the insertion of the bar C, which is applied when a change in the weather renders its use prudent and removed when the occasion for it ceases, its place being then occupied by the blank E, which fills the groove to the exclusion of the dirt or soil, being secured in the groove B by the screw D, which passes through the orifice *e*.

I have thought of using the roughing-bar attached to the face of the shoe without being inserted into a groove; but I do not consider such a device nearly so efficient, as it would be so much more readily detached by striking against stones, and it would derive no strength of position from its location, but only from the screws or rivets which are attached to it. In the method shown in the drawings the bar is protected from lateral strain or percussion, and being partially overlapped at its rear ends requires fewer rivets or screws, as their chief duty is merely to prevent its dropping out.

It will be perceived that the bar is retained in its place in the shoe mainly by the contact at the front and at the two heel-points in the former by screws, studs, or pins, or other mechanical device, and in the latter by the overlapping of the shoe A upon the heel ends of the bar. It is not a necessity of the case that the bar should fit accurately within a groove whose walls are as high as the thickness of the bar, as having but one wall it may be sufficiently protected, the recess forming a rabbet in which the bar is secured. It is also possible that through imperfection, injury, or design the walls may be so far removed as to destroy their continuous character on one or both sides, while the bar having its three points of attachment at the toe and the two heels may set firmly in its place and resist displacement.

It is possible that advantage may be derived in some cases from the removing the inner wall of circumvallation, as in that case a workman of second-rate skill could more readily make and attach a bar to the shoe than when it was to occupy a recess bounded on both sides by exact limits.

In the case of a narrow shoe a positive advantage may be derived from making the recess a rabbet, as it would admit of the extension inwardly of the bar, and thus permit the use of a wider bar, as I have before observed, the security of the attachment mainly depending upon three points of contact at the toe and two heels of the bar, and not being dependent upon an absolute fit at all points of the groove or upon the integrity or completeness of the circumjacent walls.

Fig. 4 shows the method of attaching the calks to the bar by screwing them into the latter, as it is not desired to support them by contact with the ordinary shoe, nor to make them removable. The bar itself is light and of small cost, and may be replaced by a new one when the calks which are permanently riveted or screwed thereto are worn away.

Having described my invention, what I claim therein as new, and desire to secure by Letters Patent, is—

1. The attachable and removable roughing-bar C, provided with calks and countersunk or let into the face of the shoe, substantially as described.

2. The blank-bar E′, adapted to occupy the groove B in the absence of the roughing-bar, and secured in a similar manner within the groove.

J. WILSON HODGES.

Witnesses:
LEANDER WARREN,
W. MCLAUGHLIN.